Figures 1, 2:
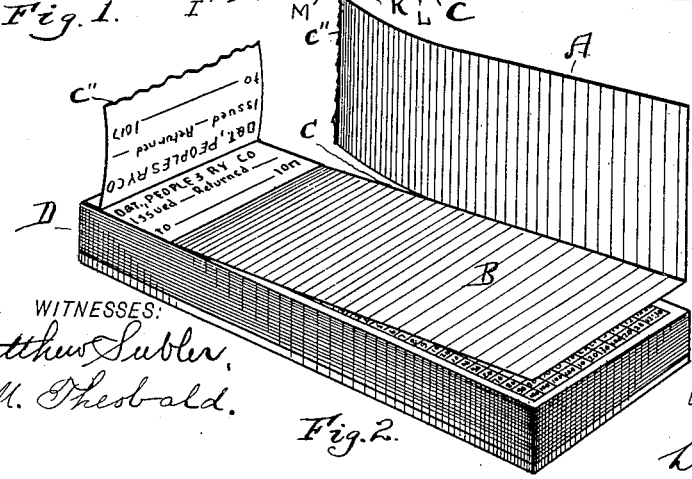

No. 763,922. PATENTED JUNE 28, 1904.
J. F. OHMER.
TRAFFIC TICKET SYSTEM.
APPLICATION FILED MAR. 26, 1903.
NO MODEL.

WITNESSES:
Matthew Subler
C. M. Theobald

INVENTOR
Jno. F. Ohmer
BY R. J. McCarty
his ATTORNEY

No. 763,922.

Patented June 28, 1904.

UNITED STATES PATENT OFFICE.

JOHN F. OHMER, OF DAYTON, OHIO, ASSIGNOR TO OHMER FARE REGISTER CO., OF ROCHESTER, NEW YORK.

TRAFFIC-TICKET SYSTEM.

SPECIFICATION forming part of Letters Patent No. 763,922, dated June 28, 1904.

Application filed March 26, 1903. Serial No. 149,658. (No model.)

*To all whom it may concern:*

Be it known that I, JOHN F. OHMER, a citizen of the United States, residing at Dayton, in the county of Montgomery and State of Ohio, have invented certain new and useful Improvements in Traffic-Ticket Systems; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention comprises a system for keeping a record of the traffic in public conveyances, especially on street and interurban railway-cars. Very many, if not all, the railroads operating in suburban districts of cities and those operating between various cities, commonly known as "suburban" and "interurban" railway companies, operate cars over the tracks of other and independent companies known as "city lines." When entering or leaving cities, the suburban or interurban cars which operate over the tracks of other companies do so under what is generally known as a "traffic arrangement," whereby the suburban or interurban cars pay tribute to the city lines over which tracks they operate. This tribute is assessed against each passenger or other traffic carried. So far as I am aware the only way heretofore employed of checking this traffic is by the conductor of the interurban or suburban car at the time of entering over the city property by first counting the passengers and thereafter registering the number counted upon the ordinary counting-machine or register. This operation is crude, to say the least, and does not provide means for making a division of the count—for example, as between adults and children—neither does it provide for separating from the passengers other traffic for which tribute must be paid, such as freight, express, baggage, &c.

The object of my invention is to provide means whereby a complete record of the traffic, whether it be adult, child, employee, or passenger traveling on a pass, freight, express, or baggage, can be obtained in concise form correctly and expeditiously and the record made and preserved for each trip.

A further object of my invention is to provide means whereby the trip-number of a car can be noted, the number of the conductor, the year, month, day, and the time of day the car enters or leaves a city or foreign line, and means are also provided for designating the direction or movement of the car.

Another object of the invention is to provide means whereby a duplicate record can be made by means of which a copy for each company interested is furnished showing a clear and concise traffic statement.

Preceding a more detailed description of my invention reference is made to the accompanying drawings, of which—

Figure 1 is an enlarged view of a duplicate sheet which contains the various columns, spaces, and headings. Fig. 2 is a perspective view showing my duplicate form in the shape of a tablet, which contains a duplicate of each detached ticket and the stubs of the detached tickets.

In a detail description of the invention similar reference characters indicate corresponding parts.

For the convenience of the conductor the tickets are arranged in the form of a tablet D and in duplicates, one being folded upon the other on the perforated line C. The printed surfaces when so folded lie outwardly, as shown in Fig. 2.

A is the ticket detached, to be delivered to the company to whom tribute is payable, and B is the duplicate ticket, remaining in the book D. The ticket A is detached from the tablet by severing it along the vertical and horizontal perforated lines C and C', leaving a stub C'' bound to the tablet D. The headings of the tickets, it will be observed, are duplicates. Suitable spaces are provided for the name of the railroad upon which the system is used, the date of the issuance of the book preceded by the word "Issued," and the date when the book is returned to the company using it preceded by the word "Returned," the person to whom the book is issued, preceded by the word "To," and the number of the book. The duplicate tickets are provided with a suitable number of parallel columns extending approximately the length of two-thirds of the ticket and are provided with proper headings. Each of said columns contains a series of rectangular spaces having suitable numerals to be punched by the conductor in the carrying out of the system. The four outermost parallel columns E, E', F, and F' contain spaces in which numerals from "1" to "100" consecutively appear. The two outermost columns E and E' contain numerals to be punched for the through traffic, either passenger, (adult or child,) baggage, express, or freight. The next adjacent columns F and F' contain the figures to be punched for local traffic of the same character—that is to say, whether such traffic be adult or child passengers, baggage, express, or freight. Immediately above the columns E, E', F, and F' are suitable spaces with the words "Adult" and "Child." These are punched to indicate the passengers, whether adults or children. Above these last-named spaces and words there are corresponding spaces containing "Amount received," "Number of packages," and above the whole are arranged two spaces with wording to indicate "Through traffic" and "Local traffic," the whole being surmounted by the name of the system—to wit, "The Ohmer system." The next inner adjacent columns of spaces provide punching-spaces for the various months and suitable punching-spaces for the years, as well as the dates of the months, for example. In the parallel column of spaces G the months are indicated, and in a suitable number of spaces H, below the years, are indicated—for example, "1903," "1904," "1905," and "1906"—and below these are parallel columns of spaces I, in which the dates of the months are indicated. A suitable intervening space J is provided for the name of the railroad on which the system is employed. A suitable number of small spaces is provided in the upper portion of the ticket, which have the letters "N," "E," "S," "W." These indicate the direction in which the car is moving, and the words "A. M." and "P. M." indicate the forenoon and afternoon. All of these spaces may be punched when a record is taken. In proximity to these spaces are arranged a suitable number of spaces, which contain the words "Trip," "Pass," "Employe." These indicia are immediately above a series of parallel space-columns K, two of which are numbered consecutively from "1" to "5" and intermittingly from "10" to "25," and the remaining one of said columns, which extends lower than the other two columns, is numbered consecutively from "1" to "20." The last-named column is immediately below the headings "A. M." and "P. M.," and adjacent to said column there is a column of spaces L, in which the time of the day is indicated.

M designates two parallel columns of spaces arranged on the lower half of the tickets and containing numerals indicating the conductor's number. These columns are headed by a space with the word "Cond'r."

The operation is as follows: When an interurban car reaches the tracks of a city line, the conductor counts the through passengers and punches the proper figures for the number of adults and children in the through-traffic columns. One of the spaces in columns M is punched for the conductor's number. The trip-number is punched from the column K. The month, year, and date is punched from spaces G, H, and I. If there are any employees or passengers traveling on passes, the proper spaces are punched from the columns K'. On the return trip the work of recording the traffic is similar. At the close of the day the conductors turn in the forms to the office. Half of the duplicate records are forwarded to the city road to show the amount due them, while the other half are kept on file by the interurban line. The form may also be used to account for express, baggage, freight, &c. The three rectangular spaces which are used to indicate the same are arranged at a convenient point in the form, and in the case of freight traffic the space bearing that indication is punched, and the number of pieces is punched out of one of the columns E and F, according to whether it is through or local traffic, and the amount received is punched out of the proper columns E' or F'. When the ticket or form is used to record baggage, express, or freight traffic, the same ticket is not used to record passenger traffic. Hence there will be no other perforations in the columns E, E', F, and F' but those indicating the number of packages and the amount received.

While I have minutely described by reference characters the several columns and headings of my duplicate traffic-ticket, I have done so merely as a means of facilitating an intelligent understanding of the scope of my system. I therefore do not wish to limit the invention to the specific position of the several columns, spaces, and their headings, as it is clear that the same may be arranged differently from that shown, and at the same time all of the functions of the ticket may be utilized.

Having described my invention, I claim—

A traffic-ticket having a series of columns with headings designating through and local traffic, further headings for said columns designating adult and child passengers, and further headings for said columns designating freight, the number of pieces thereof, and the amount received, the said columns having numerals in consecutive order, a series of columns having headings designating the dates, and other columns having headings and numerals indicating the conductor, substantially as set forth.

In testimony whereof I affix my signature in presence of two witnesses.

JOHN F. OHMER.

Witnesses:
R. J. McCarty,
H. H. Haberer.